United States Patent [19]

Hayashi

[11] Patent Number: 4,465,322
[45] Date of Patent: Aug. 14, 1984

[54] BRAKING SYSTEM FOR MOTORCYCLES
[75] Inventor: Tsutomu Hayashi, Hoya, Japan
[73] Assignee: Honda Giken Kogyo Kabushiki Kaisha, Tokyo, Japan
[21] Appl. No.: 411,027
[22] Filed: Aug. 24, 1982
[30] Foreign Application Priority Data Aug. 24, 1981 [JP] Japan .................................. 56-132416

[51] Int. Cl.³ .............................................. B60T 8/26
[52] U.S. Cl. .................................... 303/6 A; 303/116; 303/13
[58] Field of Search ....................... 188/344, 345, 349; 303/6 A, 6 C, 10, 13, 15, 101, 115, 116

[56] References Cited
U.S. PATENT DOCUMENTS 4,421,359 12/1983 Hayashi et al. ..................... 303/6 A Primary Examiner—Duane A. Reger
Attorney, Agent, or Firm—Armstrong, Nikaido, Marmelstein & Kubovcik

[57] ABSTRACT

A braking system for motorcycles, having a first manual brake-operating member consisting of a brake lever, and a second foot-power brake-operating member consisting of a brake pedal. The braking system also includes a brake oil pressure generating unit, which is provided with a first brake oil pressure chamber having a first output port, and a second brake oil pressure chamber having a second output port, and which is capable of generating an oil pressure in the first and second brake oil pressure chambers by an input thereinto from either the first brake operating member or the second brake operating member to output a brake oil pressure to the first and second output ports. A brake for front wheels is communicated with the first output port, and adapted to be operated by an output oil pressure from the first output port and thereby apply the braking force to the front wheels. A brake for rear wheels is communicated with the second output port, and adapted to be operated by an output oil pressure from the second output port and thereby apply the braking force to the rear wheels. During a braking operation, the braking force from one of the brakes is lessened and restored by an anti-lock means.

6 Claims, 7 Drawing Figures

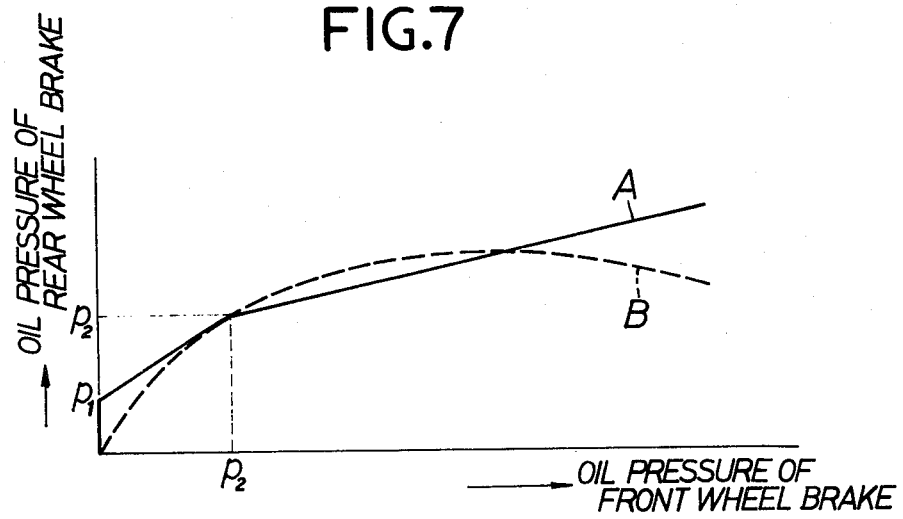

BRAKING SYSTEM FOR MOTORCYCLES

BACKGROUND OF THE INVENTION

1. Field of the Invention

This invention relates to a braking system for motorcycles, and more particularly to a braking system provided with a first manual brake-operating member and a second foot-power brake-operating member.

2. Description of the Prior Art

In a conventional generally-used braking system, a brake for applying the braking force to front wheels and a brake for applying the braking force to rear wheels are actuated independently of each other by first and second brake-operating members. If the brakes for front and rear wheels can be operated at once by a braking input from either the first brake-operating member or the second brake-operating member, the braking operation would be simplified and desirable effects could be obtained. In order to obtain such a braking system, it is to be desired with respect to the braking performance thereof for motorcycles that one of the brakes for front and rear wheels be adapted to automatically lessen and restore the braking force for one pair of wheels out of the mentioned two pairs of wheels when a braking input is excessively high, and thereby prevent the wheels from being locked, and that the other brake be adapted to freely regulate the braking force for the other pair of wheels by regulating a braking input.

SUMMARY OF THE INVENTION

A primary object of the present invention is to provide a miniaturized, simply-constructed braking system for motorcycles, which permits meeting the above-mentioned requirements.

In order to achieve the above object, the present invention provides a braking system for motorcycles comprising a first manual brake-operating member, a second foot-power brake-operating member, a brake oil pressure generating unit, which is provided with a first brake oil pressure chamber having a first output port, and a second brake oil pressure chamber having a second output port, and which is capable of generating a brake oil pressure in the first and second brake oil pressure chambers by an input from either the first brake-operating member or the second brake operating member to output a brake oil pressure from the first and second output ports, a brake for front wheels, which is communicated with the first output port, and which is adapted to be operated by an output oil pressure from the first output port and thereby apply the braking force to the front wheels, a brake for rear wheels, which is communicated with the second output port, and which is adapted to be operated by an output oil pressure from the second output port and thereby apply the braking force to the rear wheels, and an anti-lock means capable of lessening and restoring during a braking operation the braking force applied by either the brake for front wheels or the brake for rear wheels.

Owing to the above-described construction, the brake oil pressure generating unit, which is provided with the first and second brake oil pressure chambers communicated with the brakes for front and rear wheels, is operated by an input from either the first manual brake-operating member or the second foot-power brake-operating member. Namely, the braking force can be applied to the front and rear wheels by merely operating either the first brake-operating member or the second brake-operating member. Therefore, the brakes can be operated very easily.

Since the anti-lock means is operatively connected to one of the brakes for front and rear wheels, the brake for front wheels or the brake for rear wheels permits automatically lessening and restoring the braking force for the relative wheels when braking inputs from the first and second brake-operating members are excessively high, and thereby preventing the wheels from being locked. The braking force applied from the other brake to the other wheels can be regulated freely by varying the intensity of the above-mentioned braking inputs properly. Thus, a braking operation can be carried out easily and reliably in accordance with the condition of the road surface and the running condition of the motorcycle.

The anti-lock means referred to above is adapted to work on only the brake for the front wheels. A proportional reducing valve is provided in an oil passage extending from the second brake oil pressure chamber to the brake for rear wheels. Owing to this arrangement, a rate of increase in the brake oil pressure applied to the brake for rear wheels can be reduced as compared with that in the brake oil pressure applied to the brake for front wheels, after an output oil pressure from the brake oil pressure generating unit has exceeded a predetermined level. Thus, the braking force corresponding to a decrease in the load on the rear wheels, which is caused by the braking operation, can be applied to the brake for rear wheels. On the other hand, the braking force corresponding to an increase in the load on the front wheels, which is caused by the braking operation, can be applied to the brake for front wheels. Moreover, the locking phenomenon of the front brake, to which large braking force is applied, can be prevented. Consequently, the braking of both the front and rear wheels can be carried out efficiently with ease.

The brake oil pressure generating unit consists of a single cylinder body defining therein first and second cylinder bores, which are adjacent to each other via a partition, a first braking piston fitted slidably in the first cylinder bore so as to define the first brake oil pressure chamber between the surface of the piston and the partition, and a second braking piston, which is fitted slidably in the first cylinder bore so as to be aligned coaxially with the first braking piston, and which defines the second brake oil pressure chamber between the first and second braking pistons, the second braking piston having a first pressure receiving portion adapted to receive a braking input from the first brake-operating member and move the second piston forward, and a second pressure receiving portion adapted to receive a braking input from the second brake-operating member and move the second piston forward. The anti-lock means consists of a control piston fitted slidably in the second cylinder bore, defining a control oil pressure chamber on the side of the front surface thereof, and connected to the first brake piston, and an oil pressure source communicated with the control oil pressure chamber and adapted to supply a pressure oil to the control oil pressure chamber when the wheels are about to be locked during a braking operation.

Since the first and second brake oil pressure chambers and control oil pressure chamber are formed in series in a single cylinder body, a miniaturized, simply-constructed, tandem type master cylinder capable of preventing the locking phenomenon of the wheels can be obtained. Such a master cylinder can be installed easily even in a narrow space in a body of a motorcycle, and contributes much to the simplification of the construction of a braking system. If the master cylinder is removed, the three pistons, i.e. the first and second braking pistons and control piston, and their accessories can be inspected and repaired. Namely, this braking system can be subjected to maintenance work conveniently.

The first and second brake-operating members consist of a brake lever and a brake pedal, respectively. A piston rod projecting from the second braking piston extends through an end wall defining the first cylinder bore, to be connected to the brake pedal. An input oil pressure chamber is defined in the portion of the first cylinder bore which is between the second braking piston and the end wall defining the first cylinder bore. This input oil pressure chamber is communicated with the master cylinder operated by the brake lever. The piston rod projecting from the second braking piston extends through the end wall defining the first cylinder bore, to be connected to the brake pedal. Owing to the above arrangement, a braking pressure oil can be outputted from the first and second output ports by merely operating either the braking lever or the brake pedal, to actuate the brakes for front and rear brakes at once. This allows a braking operation to be carried out very easily. On the other hand, when the brake lever and brake pedal are operated simultaneously, the brakes for front and rear wheels can be actuated at once by the sum of the braking inputs thereinto. Accordingly, when the braking inputs from the brake lever and brake pedal are minimized, a braking operation can be carried out very smoothly. When the anti-lock means is operated, the operational force thereof is transmitted to the brake lever and brake pedal via the control piston and first and second braking pistons. The operator can thereby ascertain that the anti-lock means is in operation.

The first and second brake oil pressure chambers are provided therein with first and second return springs, which are adapted to urge the first and second braking pistons in the backward direction. These first and second return springs have different set loads. When these set loads are varied, either the brake for front wheels or the brake for rear wheels can be operated prior to the other by an input thereinto from any of the frist and second brake-operating members, to obtain a brake oil pressure distribution curve similar to an ideal brake oil pressure distribution curve. Thus, a braking operation can be carried out efficiently.

The piston rod projecting from the front surface of the first braking piston to contact the first braking piston is provided at a free end thereof with a stopper contacting the front surface of the partition referred to above and formed so as to restrict the backward movement of the first braking piston. This allows the construction of the stopper for the first braking piston to be simplified, and renders it unnecessary to form a screw hole for the stopper in a cylinder body. Accordingly, the interior of the cylinder body can be kept oil-tight conveniently.

The above and other objects, features and advantages of the present invention will become apparent from the detailed description of a preferred embodiment when taken in conjunction with the accompanying drawings.

BRIEF DESCRIPTION OF THE DRAWINGS

The accompanying drawings illustrate one embodiment of the present invention, in which:

FIG. 7 is a diagram showing the brake oil pressure distribution ratio for the front and rear wheel brakes, respectively.

DESCRIPTION OF THE PREFERRED EMBODIMENTS

Figure 1:
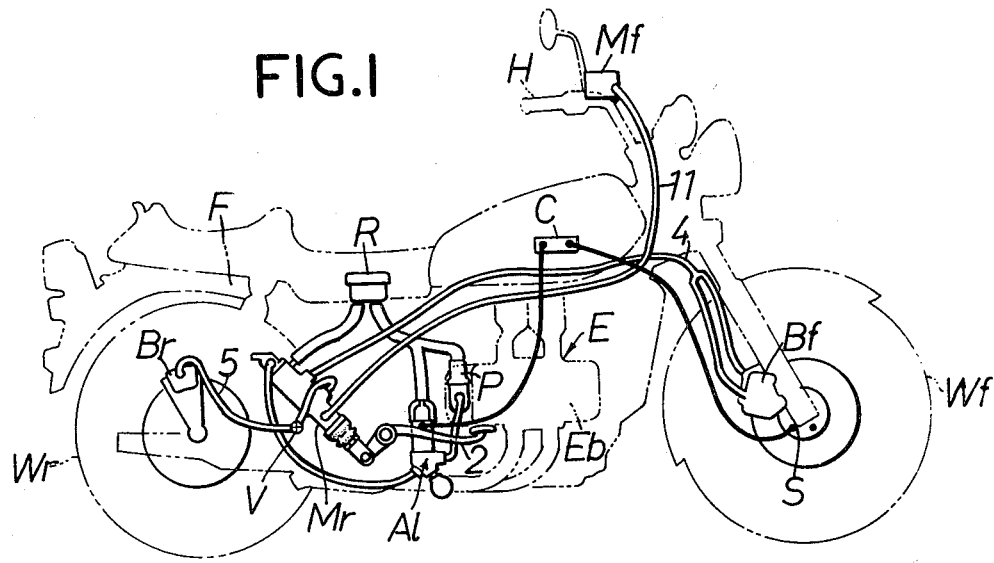
FIG. 1 is a perspective side view of a motor-cycle equipped with a brake gear.
Figure 2:
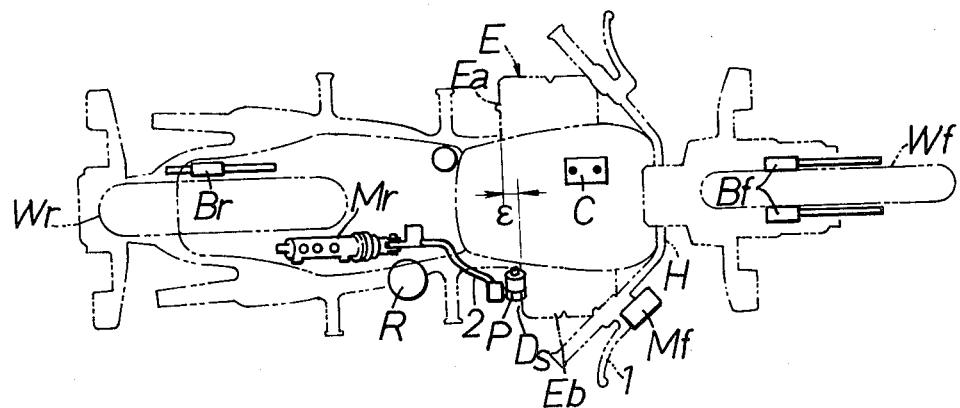
FIG. 2 is a plan view of the motor-cycle equipped with the brake gear.

In FIGS. 1 and 2, the motor-cycle is equipped on its steering handle H with a brake lever 1 and a front master cylinder Mf actuated by the brake lever. It also includes a brake pedal 2 at the lower part of the frame F and a rear master cylinder Mr actuated by the brake input from either of the brake pedal 2 and the brake lever 1. The input from the brake lever 1 to the rear master cylinder Mr is given as an output oil pressure of the front master cylinder Mf and the input from the brake pedal 2 to the raer master cylinder Mr is mechanically transmitted as will be described elsewhere in further detail.

The rear master cylinder Mr is connected to a pair of right and left oil pressure front wheel brakes Bf for braking the front wheel Wf via an oil passage 4 and is also connected to a single oil pressure rear wheel brake Br for braking the rear wheel Wr via an oil passage 5. A heretofore known proportional reducing valve V is interposed in the oil passage 5.

A horizontally opposed type engine E is mounted to the frame F at its intermediate portion between the front and rear wheels Wf and Wr and an anti-lock device Al is mounted at the rear part of the engine E. The anti-lock device Al automatically mitigates and recovers the braking force only to the front wheel brake Bf by controlling the operation of the rear master cylinder Mr at the time of braking. The control signal to this anti-lock device is generated by a speed sensor S fitted to the front wheel Wf and is sent to the anti-lock device through a signal processing unit C.

The construction of each constituent described above will be explained in further detail with reference to FIGS. 3 and 4.

The front master cylinder Mf is of a heretofore known single type. A single piston 8 actuated by the brake lever 1 is slidably fitted into a cylinder hole 7 of a cylinder main frame 6 and defines an oil pressure chamber 9 at the front part of the cylinder port 7. An oil passage 11 communicating with the rear master cylinder Mr is connected to the output port 10 of this oil pressure chamber 9. Accordingly, when the brake lever 1 is actuated so as to advance the piston 8, an oil pressure is generated inside the oil pressure chamber 9 and is applied from the output port 10 to the rear master cylinder Mr. The cylinder main frame 6 is equipped integrally with a reservoir 12 capable of feeding an operation oil to the oil pressure chamber 9.

Figure 4:
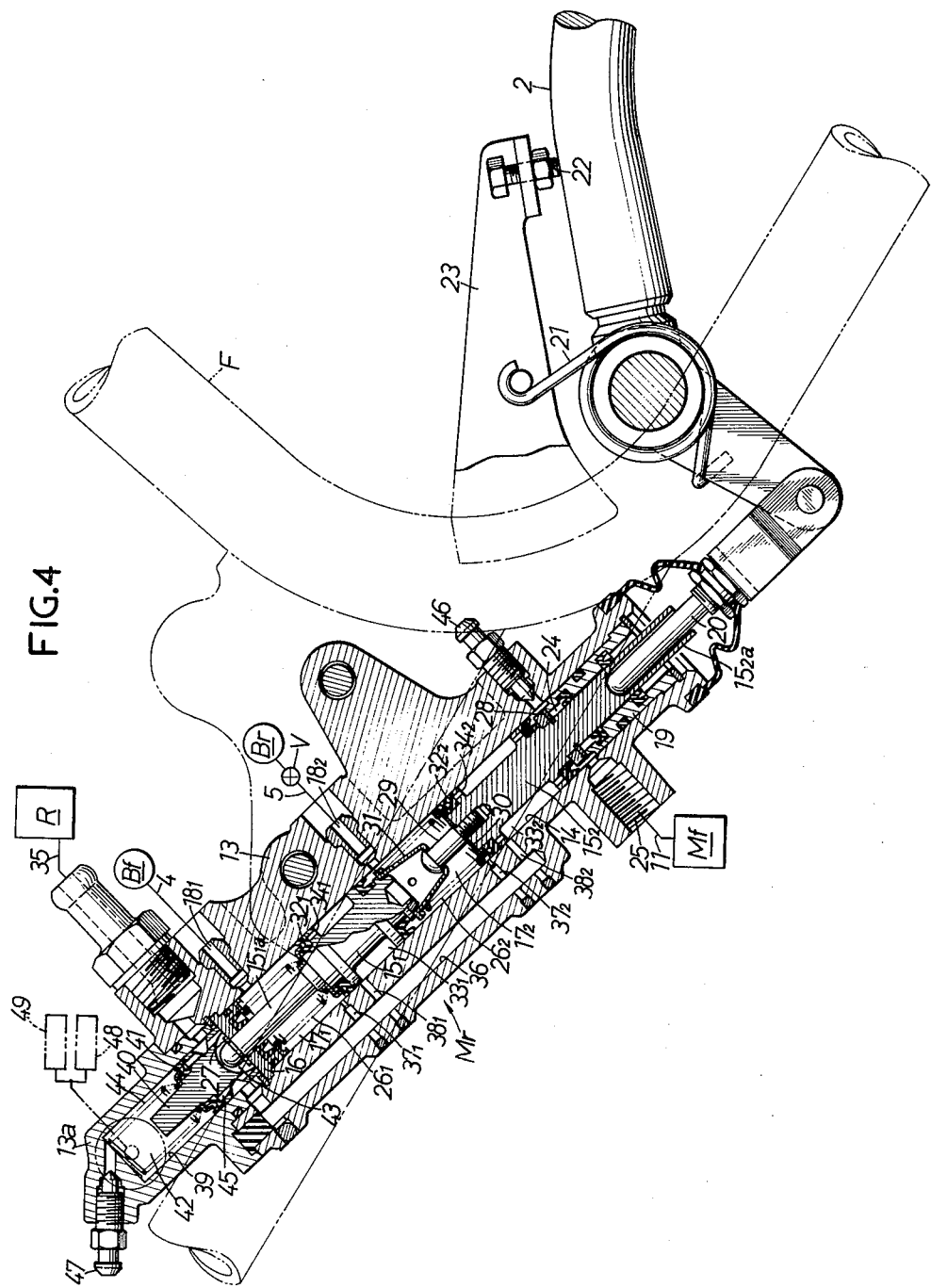
FIG. 4 is an enlarged longitudinal sectional side view of a rear master cylinder in the brake gear.

As can be best seen from FIG. 4, the rear master cylinder Mr is of a tandem type. In other words, a rear first cylinder hole 14 and a second front cylinder hole 39 are bored on the cylinder main body 13 and are aligned on the same line while interposing a fixed spacer wall 16 between them. First and second brake pistons $15_1$ and $15_2$ are slidably fitted into the first cylinder hole 14 in series with each other in the longitudinal direction of the car frame (or in the vertical direction in the drawing). The first brake piston $15_1$ and the fixed spacer wall 16 together form a first brake oil pressure chamber $17_1$ between them in the first cylinder hole 14. Both pistons $15_1$ and $15_2$ form a second brake oil pressure chamber $17_2$ between them. The first brake oil pressure chamber $17_1$ has a first output port $18_1$ opening on the side wall while the second brake oil pressure chamber $17_2$ likewise has a second output port $18_2$ opening on the side wall. The oil passage 4 communicating with the front wheel brake Bf is connected to the first output port $18_1$ and the oil passage 5 communicating with the rear wheel brake Br is connected to the second output port $18_2$.

The second brake piston $15_2$ is integrally equipped with a piston rod $15_{2a}$, which penetrates slidably through a sleeve 19 fitted and fixed to the lower end opening of the first cylinder hole 14 and forming the end wall of the cylinder hole 14, and projects outside beyond the sleeve 19. The piston rod $15_{2a}$ is interconnected to the brake pedal 2 via a push rod 20 so that when the brake pedal 2 is operated, the second brake piston $15_2$ is pushed forward (upward in the drawing) via the push rod 20. Reference numeral 21 represents a return spring for the brake pedal 2 and reference numeral 22 represents a stopper bolt which restricts the limit of backward movement of the pedal 2 and is screwed to a bracket 23 extending from the frame F so as to be capable of adjusting the limit of the backward movement of the pedal 2.

The second brake piston $15_2$ and the sleeve 19 together form an input oil pressure chamber 24 between them inside the first cylinder hole 14. The aforementioned oil passage 11 communicating with the front master cylinder Mf is connected to an input port 25 opening on one side of this oil pressure chamber 24 so that the second brake piston $15_2$ is pushed forward by the oil pressure when the oil pressure is applied from the input port 25 to the oil pressure chamber 24. Accordingly, the rear face of the second brake piston $15_2$ facing the oil pressure chamber 24 forms a first pressure-receiving portion while the piston rod $15_{2a}$ forms a second pressure-receiving portion.

The first and second brake oil pressure chambers $17_1$ and $17_2$ incorporate therein first and second return springs $26_1$ and $26_2$ for urging the first and second brake pistons $15_1$ and $15_2$ in the backward direction, or downward direction, respectively. In this case, the set load of the second return spring $26_2$ is smaller than that of the first return spring $26_1$. A circular clip-like stopper 27 is anchored to the tip of the piston rod $15_{1a}$ projecting from the front surface of the piston $15_1$ and slidably penetrating through the spacer wall 16 in order to restrict the limit of the backward movement of the first brake piston $15_1$. This stopper 27 comes into contact with the upper surface of the spacer wall 16. A circular clip-like stopper 28 coming into contact with the upper end surface of the sleeve 19 is likewise anchored to the piston rod $15_{2a}$ of the piston $15_2$ so as to restrict the limit of the backward movement of the second brake piston $15_2$.

The second return spring $26_2$ is placed under the compressed state between a fixed seat 30, which is fixed to the upper end of the second brake piston $15_2$ by a bolt 29, and a moving seat 31 which can slide on the bolt 29 within a limited range of stroke. The moving seat 31 substantially comes into contact with the lower end of the first brake piston $15_1$ when it is spaced apart by a maximal distance from the fixed seat 30, that is, when both brake pistons $15_1$ and $15_2$ are positioned at the limit of their backward movement.

The first and second brake pistons $15_1$ and $15_2$ are equipped on their front surfaces with piston caps $32_1$ and $32_a$, respectively, and have a reduced diameter at their intermediate portions so that oil feed chambers $33_1$ and $33_2$ can be defined around the reduced diameter portions, respectively. Feed oil holes $34_1$ and $34_2$ are bored on the brake pistons $15_1$ and $15_2$ and communicate the back of the piston caps $32_1$ and $32_2$ with these oil chambers $33_1$ and $33_2$, respectively.

An oil passage 36 communicating with an oil passage 35, which in turn communicates with the reservoir R, is bored on the cylinder main body 13 in parallel with the first and second cylinder holes 14 and 39. The oil passage 36 communicates with relief ports $37_1$, $37_2$ which open to the first and second brake oil pressure chambers $17_1$, $17_2$ immediately before the piston caps $32_1$, $32_2$ when the brake pistons $15_1$ and $15_2$ are positioned at the limit of their backward movement. The oil passage 36 also communicates with supply ports $38_1$ and $38_2$ which are normally open to the oil feed chambers $33_1$ and $33_2$.

The second cylinder hole 39 is bored on the cylinder cap $13_a$ that forms the front end portion of the cylinder main frame 13. A brake piston 40 equipped with a piston cap 41 on its front surface is slidably fitted into this cylinder 39. The piston 40 opposes the tip of the piston rod $15_{1a}$ of the first brake piston $15_1$. A front control oil pressure chamber 42 is defined between the control piston 40 and the outer end wall of the second cylinder hole 39, that is, the top wall of the cylinder cap $13_a$. Similarly, a rear oil feed chamber 43 is defined between the control piston 40 and the spacer wall 16. The control piston 40 is normally held at the limit of its backward movement while kept in contact with the spacer wall by a return spring 44 which is placed under compressed state in the control oil pressure chamber 42. The oil feed chamber 43 communicates with the reservoir R via the oil passage 35 in the same way as the aforementioned oil feed chambers $33_1$ and $33_2$. An oil feed hole 45 for communicating the chamber 43 with the back of the piston cap 41 is bored on the control piston 40. In FIG. 4, reference numerals 46 and 47 represent air bleeders.

The anti-lock device Al consists of the aforementioned control piston 40, a pair of normally-closed electromagnetic control valve 48 and normally-open electromagnetic control valve 49 for controlling the operation of the control piston 40, a pressure accumulator Ac for storing the operation oil pressure of the control piston 40 and an oil pressure pump P for feeding the pressure oil to this pressure accumulator Ac. The normally-closed control valve 48 is interposed in an oil passage 50 connecting the oil pressure pump P and the pressure accumulator Ac to the control oil pressure chamber 42 described above and the normally-open control valve 49 is interposed in an oil passage 51 connecting the reservoir R to the control oil pressure chamber 42. In FIG. 3, reference numerals 52, 53 and 54 represent oil filters disposed in front and at the rear of the control valves 48 and 49 and reference numeral 55 represents an oil filter disposed immediately after a discharge port 56 of the oil pressure pump P. Reference numeral 57 represents an oil passage connecting an intake port 58 of the oil pressure pump P to the reservoir R.

Next, the oil pressure pump P will be described.

The oil pressure pump P is mounted to the outer surface of the engine E. As shown in FIG. 2, a pair of integral engine blocks Ea and Eb of the horizontally-opposed type engine E, each consisting of the cylinder head and the cylinder block, project to the right and left from the car frame F, and the oil pressure pump P is mounted to the back of the front engine block Eb which is inclined forward in the longitudinal direction of the frame. This arrangement makes it possible to utilize the dead space Ds for mounting the oil pressure pump P, the dead space Ds being defined at the rear of the front engine block Eb due to the deviation $\epsilon$ of the front and rear engine blocks Eb and Ea in the longitudinal direction of the car frame F. Since the oil pressure pump does not project sideways from the frame F, this arrangement improves the appearance of the motor-cycle and protects the oil pressure pump P from any obstacle that might exist in the forward direction of the frame F.

Figure 6:
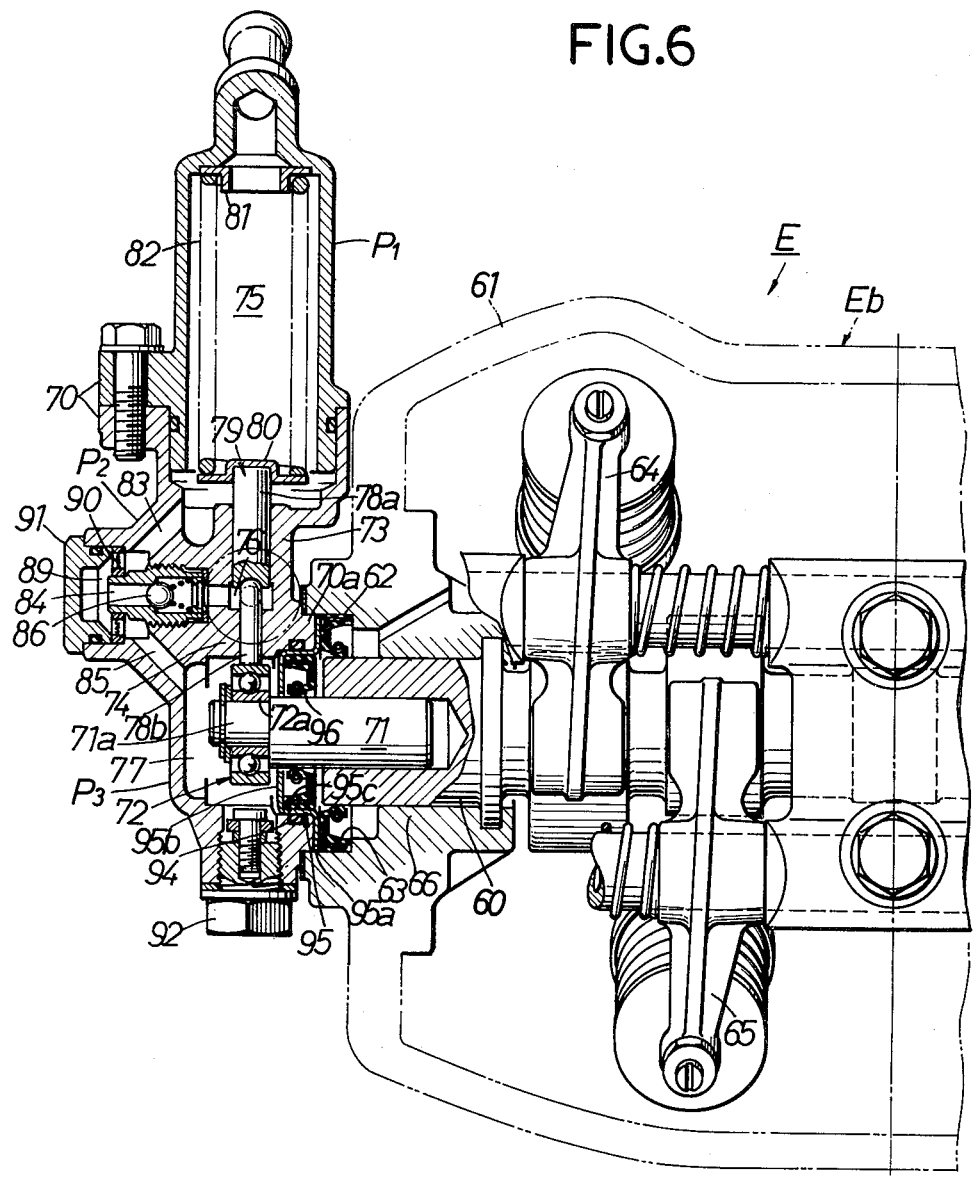
FIG. 6 is a sectional view taken along line VI—VI of FIG. 5.
Figure 5:
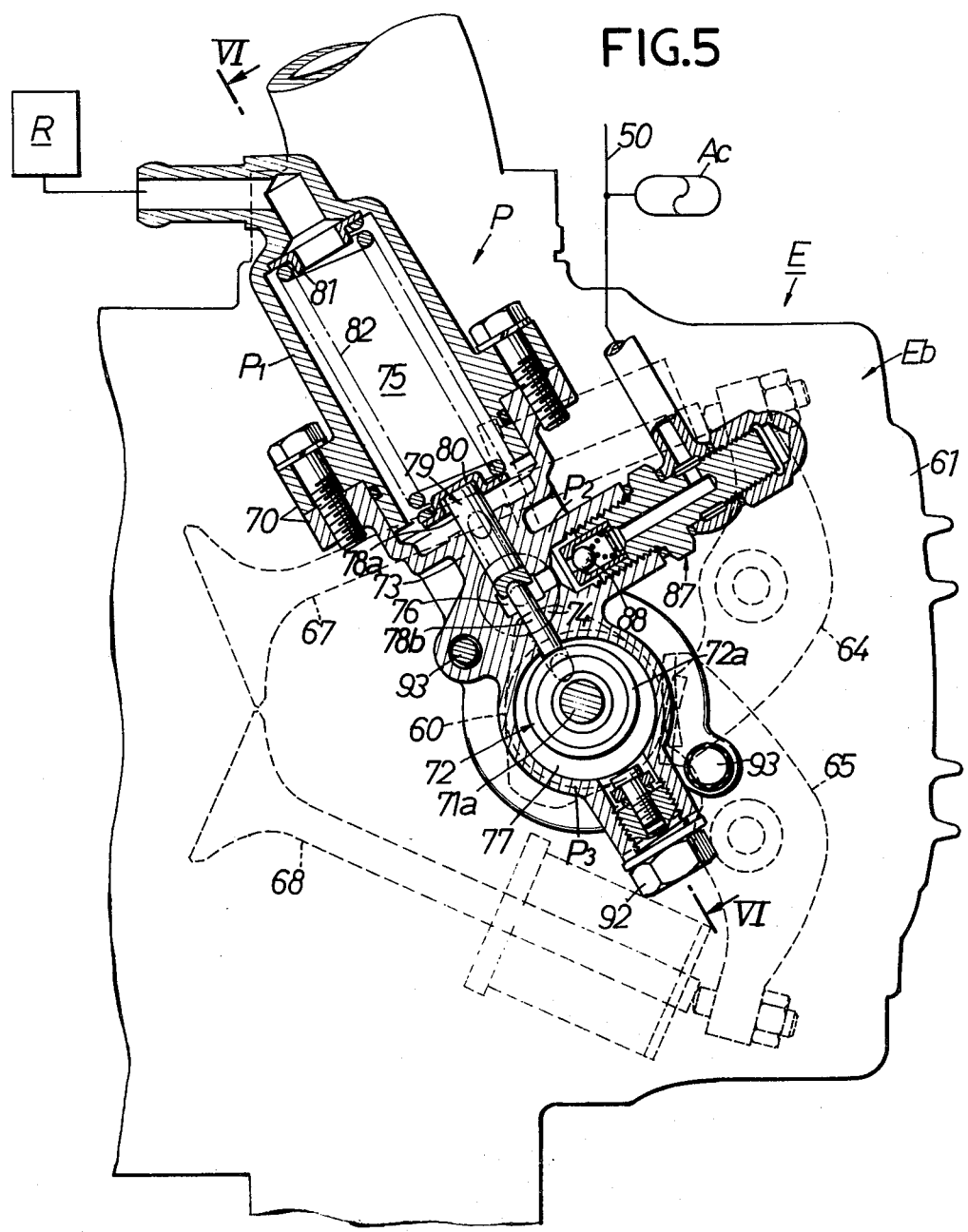
FIG. 5 is an enlarged longitudinal sectional rear view of an oil pressure pump in the brake gear when the brake gear is mounted to an engine.

As shown in FIGS. 5 and 6, an overhead type valve motion cam shaft 60 is disposed on the cylinder head of the engine block Eb and one end portion of this cam shaft 60 is turnably supported by a bearing 66 on the rear wall of the engine main body 61. The oil pressure pump P is fitted to the engine main body 61 so that it is actuated by the valve motion cam shaft 60.

The inside of the pump main body 70 of this oil pressure pump P is divided from above into an oil reservoir/spring chamber 75, a pump chamber 76 and an operation chamber 77 by a pair of upper and lower spacer walls 73 and 74 and each of these chambers 75, 76 and 77 stores therein various constituents that will be later described. Thus, the oil pressure pump longitudinally consists of an oil reservoir portion $P_1$ at the upper portion, a pump portion $P_2$ positioned at the intermediate portion, sucking the operation oil from inside the oil reservoir $P_2$ and discharging it outside and an operation portion $P_3$ positioned at the lower portion and applying the pump operation to the pump portion $P_2$.

The tip of a pump driving shaft 71 having a relatively small diameter is placed inside the operation chamber 77 and the base end of the driving shaft 71 is fixed to the outer end portion of the valve motion cam shaft 60. An eccentric pin 71a is formed at the tip of the driving shaft 71 and an antifriction bearing to serve as an eccentric cam 72, e.g. a ball-and-roller bearing, is fitted to the pin 71a. Since the heretofore known type can be used as the antifriction bearing, the eccentric cam can be obtained extremely easily.

A plunger 79 is of a double split type consisting of a large diameter shaft portion 78a and a small diameter shaft portion 78b having a sufficiently reduced diameter in comparison with the diameter of the former 78a and the lower end of the small diameter shaft portion 78b engages with the outer circumference of the eccentric cam 72. The small diameter shaft portion 78b slidably penetrates through the spacer wall 74 and projects into the pump chamber 76. Then, it comes into contact with the lower end of the large diameter shaft portion 78a which slidably penetrates through the spacer wall 73. The upper end of the large diameter shaft portion 78a projecting into the spring chamber 75 is equipped with a moving seat 80 while the ceiling of the spring chamber 75 is equipped with a fixed seat 81. A spring 82 is placed under compressed state between these seats 80 and 81 with a predetermined set load.

The spring chamber 75 is communicated with the reserver R via the oil passage 56 while the pump chamber 76 is communicated with the pressure accumulator Ac via the oil passage 50.

First and second oil passages 83 and 84 are formed on the spacer wall 73 so as to communicate the spring chamber 75 with the pump chamber 76 and a unidirectional valve which allows the passage of a fluid in only one direction from the spring chamber 75 to the pump chamber 76, that is, a suction valve 86, is disposed in the seciond oil passage 84. Another unidirectional valve which allows the passage of flow in only one direction from the pump chamber 76 to the acculator Ac, that is, a discharge valve 88, is disposed in the flow passage inside a joint 87 that connects the pump chamber 76 to the oil passage 50.

An oil passage 85 is formed on the spacer wall 73 so as to communicate the spring chamber 75 with the operation chamber 77 so that the operation oil flowing into the spring chamber 75 is introduced into the operation oil 77 as a lubricant.

A filter chamber 89 opening outside is defined on the pump main body 70 in the vicinity of the spacer wall 73 and the first through third oil passages 83, 84, 85 join inside the filter chamber 89. An oil filter 90 is placed inside the filter chamber 89 so as to separate the second oil passage 84 equipped with the suction valve 86 from the rest of the first and third oil passages 83 and 85 inside the filter chamber 89. A detachable cap 91 for closing the opening of the filter chamber 89 holds the oil filter 90 in place. Accordingly, the suction valve 86 can always feed the operation oil, that is filtered by the oil filter 90, to the pump chamber 76. The oil filter 90 can be easily inspected or replaced after the cap 91 is removed. Air vent of the pump chamber 76 can also be effected easily by deliberately opening the suction valve 86. Incidentally, reference numeral 92 in FIG. 6 represents a drain bolt of the operation chamber 77.

A seal housing 63 is formed on the outer surface of the side wall of the engine main body 61 so as to coaxially encompass the valve motion cam shaft 60 and the oil seal 62 of the shaft 60 is fitted to the seal housing 63. An annular locating protuberance 70a is protrusively formed on the outer surface of the side wall of the pump main body 70 so as to coaxially encompass the pump driving shaft 71. The protuberance 70a is fitted to the seal housing 63 of the engine main body 61. This arrangement makes it possible to correctly locate the oil pressure pump P to the engine main body 61 and to normally operate the pump P. Since the seal housing 63 is used for locating the oil pressure pump P, no locating member is need, in particular, and the construction can be simplified.

The protuberance 70a transmits the reaction of the operating force of the eccentric cam 72 acting upon the pump main body 70 to the engine main body 61 and let the latter (61) bear the reaction. Hence, a bolt 93 does not undergo deflection upon receiving the reaction. After the locating protuberance 70a is fitted, the upper end portion of the pump main body 70, that is, the portion of the main body on the side of the spring chamber 76, is inclined toward the car frame or in the center direction of the engine E and is then fixed to the engine main body 61 by the bolt 93. The oil pressure pump P can be concealed behind the front engine block Eb and does not become an unnecessary protuberance on the side of the car frame F. The oil passages between the oil pressure pump P and the reservoir R and between the pump P and the pressure accumulator Ac can be shortened and the feed efficiency of the operation oil to these constituents can be improved.

A seal retainer 95 is equipped with a cylindrical portion 95c and outward and inward flanges 95a and 95b formed at its both open edges. The cylindrical portion 95c is fitted to the inner circumference of the locating protuberance 70a via the seal ring 94. The outward flange 95a is fitted to the seal housing 63 and functions as a centering member for holding the seal retainer 95 concentrically with the pump driving shaft 71. The outward flange 95a is clamped between the locating protuberance 70a and both edge surfaces of the oil seal 62. The inward flange 95b is interposed between the eccentric cam 72 and the oil seal 96 so as to serve as a stop member which leaves the seal retainer 95 on the side of the pump driving shaft 71 when the pump main body 70 is removed.

Accordingly, the oil seals 62 and 96 are always held on the valve motion cam shaft 60 and the pump driving shaft 71 by the oil retainer 95. Thus, they neither come off and undergo damage when the pump main body 70 is removed, nor leak the lubricant of the engine E or the operation oil inside the operation chamber 77 in the oil pressure pump P to the outside. The pump driving shaft 71 has a diameter smaller than that of the valve motion cam shaft 60 and its sliding speed with respect to the oil seal 96 during rotation is lower. Hence, the oil seal 96 has higher durability.

The position of engagement between the eccentric cam 72 of the oil pressure pump P and the tappet 78 is such that when the oil pressure pump is mounted, the phase of the engagement on the circumference is greatly deviated from the position of engagement between the valve motion cam shaft 60 of the engine E and an intake rocker arm 64 and between the cam shaft 60 and an exhaust rocker arm 65, as shown in FIG. 5. This arrangement distributes the load acting upon the valve motion can shaft 60 and upon the bearing 66 supporting the cam shaft 60 and improves durability. Incidentally, reference numerals 67 and 68 represent intake and exhaust valves that are released from the valve motion cam shaft 60 via the rocker arms 64 and 65, respectively.

Next, the operation of this embodiment will be described.

Figure 3:
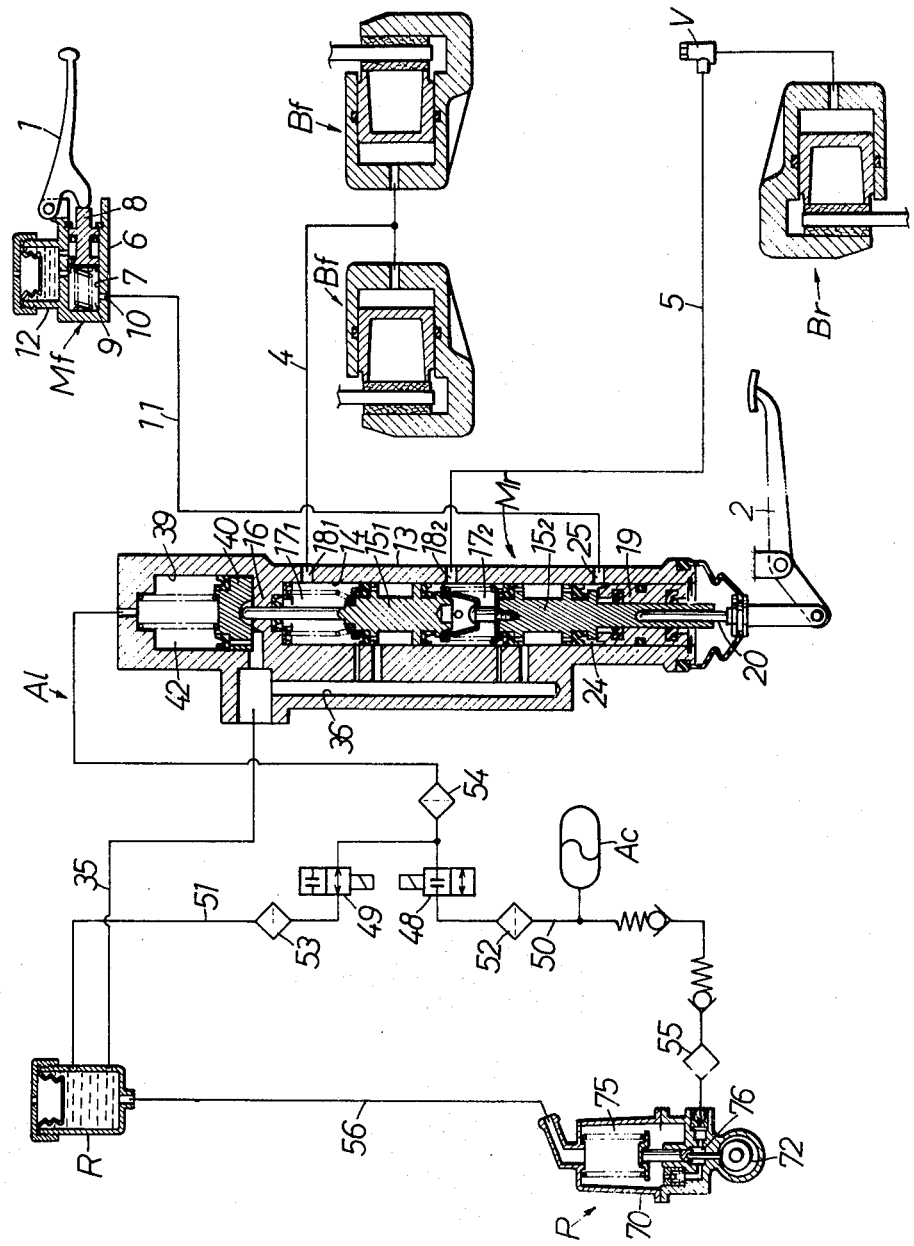
FIG. 3 is an oil pressure circuit diagram of the brake gear.

Referring initially to FIGS. 3 and 4, when the front master cylinder Mf is actuated by the brake lever 1, the oil pressure developing inside its oil pressure chamber 9 is applied from the input port 25 to the oil pressure chamber 24 of the rear master cylinder Mr via the oil passage 11. This oil pressure pushes forward the second brake piston $15_2$ and its reaction is borne by the sleeve 19 but is not transmitted to the push rod 20.

When the brake pedal 2 is stepped, the pedalling force is mechanically applied to the second brake piston $15_2$ via the push rod 20, pushing forward the second brake piston $15_2$. The input oil pressure chamber 24 whose volume increases at this time sucks only the operation oil inside the reservoir 12 of the front master cylinder Mf through the oil pressure chamber 9 and the oil passage 11. Hence, no reaction acts upon the brake pedal 1.

When both brake lever 1 and brake pedal 2 are simultaneously operated, the sum of the push force resulting from the output oil pressure of the front master cylinder Mf and the push force resulting from the push rod 20 is applied as the brake input to the second brake piston $15_2$.

When the second brake piston $15_2$ receives the brake input such as described above, the first and second brake pistons $15_1$ and $15_2$ advance while compressing the first and second return springs $26_1$ and $26_2$, and after their piston caps $32_1$ and $32_2$ pass by the relief ports $37_1$ and $37_2$, the oil pressure is generated inside the first and second brake oil pressure chambers $17_1$ and $17_2$ in accordance with the advancing distances of the brake pistons $15_1$ and $15_2$. The oil pressure generated inside the first brake oil pressure chamber $17_1$ is transmitted from the first output port $18_1$ to the front wheel brake Bf to actuate it through the oil passage 4 and the oil pressure generated inside the second brake oil pressure chamber $17_2$ is transmitted from the second output port $18_2$ to the rear wheel brake Br to actuate it through the oil passage 5, applying the braking force to the front and rear wheels Wf and Wr, respectively.

As described already, the set load of the second return spring $26_2$ is smaller than that of the first return spring $26_1$. At the initial stage of operation of the second brake piston $15_2$, therefore, the second return spring $26_2$ is compressed before the advance of the first brake piston $15_1$ and the oil pressure is first generated inside the second brake oil pressure chamber $17_2$. When its oil pressure reaches a predetermined value $P_1$, the first return spring $26_1$ is then compressed and the first brake piston $15_1$ starts advancing, generating the oil pressure inside the first brake oil pressure chamber $17_1$. Since the known proportional reducing valve V is disposed in the oil passage 5 between the output port $18_2$ of the second brake oil pressure chamber $17_2$ and the rear wheel brake Br, when the output oil pressure of the second output port $18_2$ reaches a predetermined value $P_2$, the output oil pressure is reduced to a predetermined ratio by the proportional reducing valve V and is then transmitted to the rear wheel brake Br. On the other hand, since the oil passage 4 between the output port $18_1$ of the first brake oil pressure chamber $17_1$ and the front wheel brake Bf is kept always conductive, the output oil pressure of the first output port $18_1$ is transmitted as such to the front wheel brake Bf. As a result, the brake oil pressure at each of the front and rear wheel brakes Bf and Br rises along the brake oil pressure distribution line A shown in FIG. 7. This characteristic is approximate to an ideal brake oil pressure distribution curve B for a motor-cycle and the driver of the motor-cycle can brake easily and efficiently.

At the time of braking, the control piston 40 is also advanced via the piston rod $15_{1a}$ along with the advance of the first brake piston $15_1$. Since the control oil pressure chamber 42 is generally communicated with the reservoir R via the normally-open control valve 49, however, the operation oil inside the control oil pressure chamber 42 is discharged toward the reservoir R along the advance of the control piston 40 and hardly acts as the resistance against the brake input.

If the front wheel is about to cause lock along with brake, the signal processing unit C shown in FIG. 1 rapidly judges the situation from the incoming signal generated by the front wheel speed sensor S and sends a valve closing signal to the normally-closed control valve 49 and a valve opening signal to the normally-closed control valve 48 shown in FIG. 3. When both control valves 48 and 49 operate as instructed by the respective signals, the oil passage 51 is cut off and at the same time, the oil passage 50 becomes conductive so that the pressure oil from the pressure accumulator Ac is supplied to the control oil pressure chamber 42 through the oil passage 50 and this oil pressure slightly moves back the first control piston $15_1$ via the control piston 40 against the brake input, thus reducing the internal pressure of the first brake oil pressure chamber $17_1$. As a result, the braking force of the front wheel brake Bf drops and the lock phenomenon of the front wheel Wf is avoided.

Thereafter, the signal processing unit C detects the situation, returns both control valves 48 and 49 to their normal positions and reduces the pressure of the control oil pressure chamber 42. In consequence, the braking force of the front wheel brake Bf again increases, and since sequence of the operation is repeated at a high speed, the front wheel Wf can be efficiently braked without causing lock.

The backward movement of the first brake piston $15_1$ by the operation of the control piston 40 raises the internal pressure of the second brake oil pressure chamber $17_2$ on the contrary but since the pressure rise is instantaneous, it is deformed by elastic deformation of each portion of the oil pressure system of the rear wheel brake Br, thereby not deteriorating the operation feeling of the brake lever 1 and that of the brake pedal 2.

In this manner, the braking force of the rear wheel brake Br can be freely adjusted even while the anti-lock device Al controls the braking force of the front wheel brake Bf, by adjusting the braking input to the second brake piston $15_2$.

When both brake lever 1 and brake pedal 2 are released so as to release the brake of the front and rear wheels Wf and Wr, the first and second brake pistons $15_1$ and $15_2$ are moved back by the force of the first and second return springs $26_1$ and $26_2$. When the internal pressure of the first and second brake oil pressure chambers $17_1$ and $17_2$ drops below the atmospheric pressure along therewith, the outer circumference of the piston caps $32_1$ and $32_2$ contract due to the pressure difference between these oil chambers $17_1$, $17_2$ and the oil feed chambers $33_1$, $33_2$ which are at the atmospheric pressure, forming thereby a gap between the inner wall of the first cylinder hole 14. Hence, the oil is fed to the brake oil pressure chambers $17_1$ and $17_2$ from the oil feed chambers $33_1$ and $33_2$ through the oil feed holes $34_1$ and $34_2$ and the excess oil is returned to the reservoir R through the oil passage 35 from the relief ports $37_1$ and $37_2$. In the interim, the oil is fed to the oil feed chambers $33_1$ and $33_2$ from the oil passage 36 through the supply ports $38_1$ and $38_2$.

On the other hand, when the control piston 40 moves back, too, the oil is supplied from the oil feed chamber 43 to the control oil pressure chamber 42 through the oil feed hole 45 in the same way as described above. Accordingly, especially because the control piston 40 reciprocates, the oil circulates in the route consisting of the control oil pressure chamber 42, the oil passage 51, the reservoir R, the oil passage 35, the oil feed chamber 43, the oil feed hole 45 and the control oil pressure chamber 42 and hence, the bubbles are prevented from remaining inside the control oil pressure circuit including the control oil pressure chamber 42.

Next, the operation of the oil pressure pump P will be described. When the valve motion cam shaft 60 rotates and hence, when the pump driving shaft 71 rotates due to the operation of the engine E, the eccentric cam 72 which causes eccentric motion with the driving shaft 71 applies vertical reciprocating motion to the plunger 79 in cooperation with the spring 82. This reciprocation causes repeated swelling and contraction of the volume of the pump chamber 76. At the time of swelling, the internal pressure of the pump chamber 76 is reduced and the suction valve 86 opens so that the operation oil fed from the reserver R to the spring chamber 75 is sucked into the pump chamber 76. At the time of contraction, the internal pressure of the pump chamber 76 increases and the discharge valve 88 opens so that the pressur oil is supplied from the pump chamber 76 to the accumulator Ac.

The outer lace 72a of the eccentric cam 72, which causes reciprocating motion of the plunger 79 in the manner described above, receives the force of the spring 82 during motion of the cam 72 via the plunger 79 and hence, it hardly rotates. It is thus possible to minimize sliding between the outer lace 72a and the small diameter shaft portion 78b of the plunger 79 and to prevent worn-out of their engaging portions. The driving torque for reciprocating the plunger 79 can also be reduced. When the oil pressure inside the pressure accumulator Ac rises and reaches a predetermined value, the oil pressure inside the pump chamber 76 shows a similar value and the push-up force of this oil pressure relative to the large diameter shaft portion 78a of the plunger 79 balances with the push-down force of the spring 82, that is, the set load, and keeps the large diameter shaft portion 78a close to the limit of rise by the small diameter shaft portion 78b. Hence, only the small diameter shaft portion 78b repeats vertical motion while following up the movement of the eccentric cam 72. In this case, the push-down force of the small diameter shaft portion 78b is given by the oil pressure inside the pump chamber 76 so that the suction valve 86 is kept closed by the oil pressure inside the pump chamber 76 rather than by the descension of the small diameter shaft portion 78b. Thus, the oil pressure pump P stops the pumping operation and does not apply an unnecessary load to the engine E. The push force by the oil pressure inside the pump chamber 76 acts upon the engaging surface between the small diameter shaft portion 78b and the eccentric cam 72 but this push force is negligible as the load to the engine E because the diameter of the small diameter shaft portion 78b is sufficiently small.

Additionally, the present invention can be also applied to a motor-cycle to which a V-shaped engine is mounted.

What is claimed is:

1. A braking system for motorcycles, comprising a first manual brake-operating member, a second foot-power brake-operating member, a brake oil pressure generating unit, which is provided with a first brake oil pressure chamber having a first output port, and a second brake oil pressure chamber having a second output port, and which is capable of generating a brake oil pressure in said first and second brake oil pressure chambers by an input from either said first brake-operating member or said second brake operating member to output a brake oil pressure from said first and second output ports, a brake for front wheels, which is communicated with said first output port, and which is adapted to be operated by an output oil pressure from said first output port and thereby apply the braking force to said front wheels, a brake for rear wheels, which is communicated with said second output port, and which is adapted to be operated by an output oil pressure from said second output port and thereby apply the braking force to said rear wheels, and an anti-lock means capable of lessening and restoring during a braking operation the braking force applied by either said brake for front wheels or said brake for rear wheels.

2. A Braking system for motorcycles according to claim 1, wherein said braking system further includes a proportional reducing valve, which is provided in an oil passage extending between said second output port and said brake for rear wheels, and which is adapted to proportionally reduce an output oil pressure from said second output port when the output oil pressure has exceeded a predetermined level, to transmit the resulting oil pressure to said brake for rear wheels, said anti-lock means being adapted to work on said front wheels only.

3. A braking system for motorcycles according to claim 1 or 2, wherein said brake oil pressure generating unit consists of a single cylinder body defining therein first and second cylinder bores, which are adjacent to each other via a partition, a first braking piston fitted slidably in said first cylinder bore so as to define said first brake oil pressure chamber between the surface of said piston and said partition, and a second braking piston, which is fitted slidably in said first cylinder bore so as to be aligned coaxially with said first braking piston, and which defines said second oil pressure chamber between said first and second braking pistons, said second braking piston having a first pressure receiving portion adapted to receive a braking input from said first brake-operating member and move said second piston forward, and a second pressure receiving portion adapted to receive a braking input from said second brake-operating member and move said second piston forward, said anti-lock means consisting of a control piston fitted slidably in said second cylinder bore, defining a control oil pressure chamber on the side of the front surface thereof, and connected to said first brake piston, and an oil pressure source communicated with said control oil pressure chamber and adapted to supply a pressure oil to said control oil pressure chamber when said wheels are about to be locked during a braking operation.

4. A braking system for motorcycles according to claim 3, wherein said first and second brake-operating members consist of a brake lever and a brake pedal, respectively, said braking system further including a master cylinder operated by said master cylinder, an input oil pressure chamber formed in the portion of said first cylinder bore which is between said second braking piston and an end wall defining said first cylinder bore, and a piston rod projecting from said second braking piston and extending through said end wall defining said first cylinder bore, to be connected to said brake pedal.

5. A braking system for motorcycles according to claim 3, wherein said braking system further includes first and second return springs provided in said first and second brake oil pressure chambers, adapted to urge said first and second braking pistons in the backward direction, and having different set loads.

6. A braking system for motorcycles according to claim 3, wherein said first braking piston has a piston rod projecting from a front surface thereof and extending slidably through said partition to contact said control piston, said piston rod being provided at a free end thereof with a stopper contacting a front surface of said partition and restricting the backward movement of said first braking piston.

* * * * *